Figure 1:
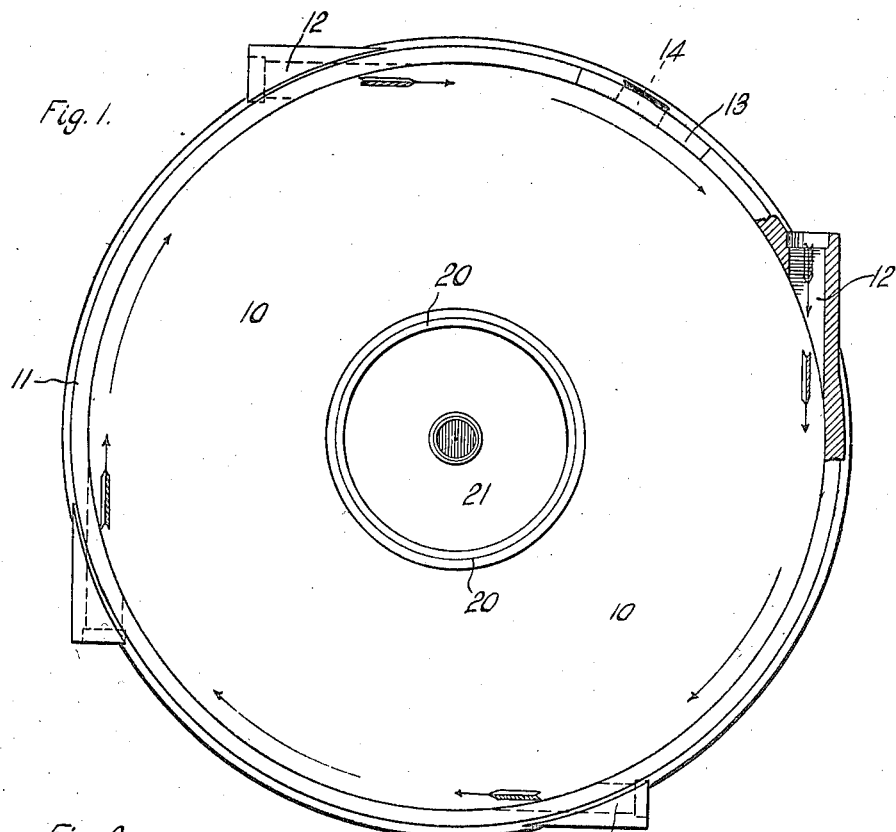

E. S. COBB.
SETTLING BASIN.
APPLICATION FILED JAN. 3, 1913.

1,125,658.

Patented Jan. 19, 1915.

Witnesses.

Inventor
Edward S. Cobb
by
his Attorney.

UNITED STATES PATENT OFFICE.

EDWARD S. COBB, OF WHITTIER, CALIFORNIA.

SETTLING-BASIN.

1,125,658.   Specification of Letters Patent.   Patented Jan. 19, 1915.

Application filed January 3, 1913. Serial No. 739,997.

*To all whom it may concern:*

Be it known that I, EDWARD S. COBB, a citizen of the United States, residing at Whittier, in the county of Los Angeles, State of California, have invented new and useful Improvements in Settling-Basins, of which the following is a specification.

This invention relates to settling basins adapted for settling and separating any solids mechanically suspended and carried in liquids and, particularly, which are only slightly greater specific gravity than the liquid; and for settling and separating solids from water. Waters are found to frequently contain large amounts of sand and silt and other solid matter which it is highly desirable to remove before transmitting the water through distribution systems for irrigation and domestic use; as otherwise the sand and silt will settle within the distribution system and eventually necessitate its thorough cleaning.

It is the prime object of my invention to provide a simple and efficient device for obviating these and other attendant difficulties by separating from the water the sand and silt and other solid matter before the water is passed into a distributing system. Also, in cases where the water is raised from wells by compressed air, it is important to fully separate the air therefrom before same is allowed to enter distributing pipes; and my apparatus is capable of separating such air either alone or simultaneously with the separation of the solids.

The essential features of my device are contained in a pan or basin into the peripheral portions of which the water is injected in such manner as to produce quiet rotation of the whole body of water, and particularly of that portion of the water adjacent the periphery of the pan or basin; the basin having a central overflow outlet into which the water flows to pass out of the device. In addition to the circular rotation of the water there is an inward movement due to the fact that the supply is at the periphery while the outlet is centrally located. As the water moves inwardly it gradually loses its rotational movement by reason of friction with the bottom of the basin and with the central outlet overflow wall. The lower portions of the water lose their rotational movement to a greater extent than does the surface water, and the water near the center loses most all of its rotational motion; hence, as will be more particularly described, there is a slow upward and very slightly rotational movement of water at the center of the basin adjacent to the overflow wall of the outlet. This movement of the water, combined with the centrifugal action of the rotation and with the gravitational action, causes the settling of most of the sand and silt and other solid particles to the bottom at or near the outer boundary wall. In this position the deposit is farthest from the outflow of clean water.

Figure 2:
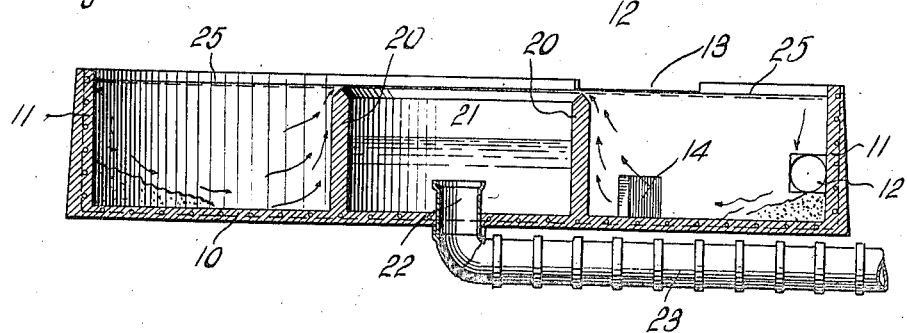

I have illustrated a preferred form of my invention in the accompanying drawings, in which:

Figure 1 is a plan, showing parts in section, of my settling basin. Fig. 2 is a vertical cross section of the same.

In the drawings I have shown a basin suitably constructed of reinforced concrete; but any other material may be utilized. I have illustrated a basin having a flat bottom 10 with a vertical bounding wall 11, preferably circular in form. I employ any desired number of tangential water inlets 12 which, in my concrete construction, are built into the bounding wall 11 and are adapted to connect with suitable feed pipes. These inlets may be of any desired size and number; but are preferably of such design as to allow the quiet inflow of a suitable amount of water corresponding to the capacity of the settling basin. The direction of the inlets may be any such as will give rotation to the body of water in the basin; and I prefer to have inlets directed truly tangentially. The bounding wall 11 has a waste overflow notch or depression 13 and a cleaning opening 14 for flushing out the accumulated deposits. The overflow 13 is for the purpose of preventing the water level in the basin from rising above a certain desired level.

Centrally situated within the basin, and preferably concentric with the outer bounding wall, is an annular overflow wall 20 of the general configuration and design shown in the drawings. This overflow wall incloses a small overflow basin 21 from which the water finds escape through outlet 22. A suitable pipe or any other means 23 may be employed for carrying off the clear water. The upper edge of the overflow wall is slightly lower than the level of the waste depression 13 and the water in the basin normally extends to about the level indicated at 25.

In operation, the water is let into the basin through the inlets 12, imparting to the mass of water therein a slow quiet rotation. In actual practice, the basin is of considerable diameter so that it may require some few minutes for the water to make a circuit of the outer edge. It will be seen that the rotational movement is gradually damped as the water proceeds inwardly, by friction with the bottom 10 and with the overflow wall 20. The lower portions of the water lose more of their rotary motion than does the surface water; and consequently there is a tendency of the lower water to move inwardly at greater velocity than the upper water. This condition causes the actual upward movement of the water near the overflow wall 20; and I have demonstrated that the larger part of the water passing over the overflow wall comes from below rather than from the surface. The upward movement at the center is a measure of the total quantity of water acting and has only a very slight rotational motion, depending upon the relative diameters of the two inclosing walls. The centrifugal action, being greatest at the outer periphery, induces deposit of heavier particles at this point. As rotation speed reduces toward the center, gravitation will act on the lighter particles which will be deposited more generally over the whole bottom. The result is that in most cases the greatest deposit is made at points farthest from the outflow of the clear water.

The outflowing water passes into the basin 21 and thence through the outlet 22. The level in basin 21 may vary with the amount of water passing from the overflow wall; and this amount may vary with variation of the water level in the settling basin. The limits between which the water level in the settling basin may vary are fixed by the height of the discharge overflow and of the waste overflow notch or depression 13. The waste overflow notch or depression 13 is essential only as providing a fixed point for the care of overflow water in case more should be delivered to the settling basin at any time than is being drawn off through the regular discharge openings, as at 22.

Having described my invention, I claim:

1. A combined centrifugal and gravity settling basin, comprising a basin having a substantially circular bounding wall, a central outlet having a surrounding overflow wall lower than said bounding wall, and means for injecting liquid substantially tangentially into the outer portions of the basin near the bounding wall, said basin being unobstructed between said walls and bottom.

2. A combined centrifugal and gravity settling basin, comprising a basin having a substantially circular bounding wall, a central outlet having a surrounding overflow wall lower than said bounding wall, and means for injecting liquid tangentially into the outer portion of the basin near the bounding wall, the length of the bounding wall and velocity of the injection being such that the liquid requires some considerable time to complete the circuit, said basin being unobstructed between said walls and bottom.

3. A combined centrifugal and gravity settling basin, comprising a basin having a substantially circular bounding wall, a central outlet having a surrounding overflow wall lower than said bounding wall, and means for injecting liquid substantially tangentially into the outer portion of the basin near the bounding wall somewhat above the basin bottom, said basin being unobstructed between said walls and bottom.

4. A combined centrifugal and gravity settling basin, comprising an annular basin having an outer bounding wall and an inner overflow wall of less height and of considerably less diameter than that of the bounding wall, and tangential injection means for liquid at the bounding wall, the body of liquid near the bounding wall of the basin affected directly by the injection being only a small part of the whole body of liquid in the basin, said basin being unobstructed between said walls and bottom.

5. A combined centrifugal and gravity settling basin, comprising an annular basin having an outer bounding wall and an inner overflow wall of less height and of considerably less diameter than that of the bounding wall, and tangential injection tubes for liquid at the bounding wall, the cross-sectional area of the tubes being small as compared with the cross-sectional area of the basin, said basin being unobstructed between said walls and bottom.

6. A combined centrifugal and gravity settling basin, comprising a basin having a suitable bottom with a circular bounding wall, an outlet leading from the bottom center of the basin, a circular overflow wall surrounding the outlet and of lesser height than the bounding wall, and liquid injection tubes discharging tangentially into the basin through the bounding wall somewhat above the basin bottom, said basin being unobstructed between said walls and bottom.

7. A combined centrifugal and gravity settling basin, comprising a basin having a suitable bottom with a circular bounding wall, said wall having an overflow on its upper edge and a cleaning opening at its bottom, an outlet leading from the bottom center of the basin, a circular overflow wall surrounding the outlet and of lesser height than the overflow of the bounding wall, and liquid injection tubes discharging tangentially into the basin through the bounding wall somewhat above the basin bottom, said basin being unobstructed between said walls and bottom.

8. A combined centrifugal and gravity settling basin, comprising a basin having a suitable bottom and a vertical circular bounding wall of height considerably less than the basin diameter, an outlet pipe leading downwardly through the center of the basin bottom, the upper open end of the outlet pipe being above the bottom, a circular overflow wall concentrically surrounding the outlet pipe, said overflow wall being of height less than that of the bounding wall, and liquid injecting tubes leading through the bounding wall somewhat above the basin bottom to inject liquid tangentially into the basin, said basin being unobstructed between said walls and bottom.

9. A combined centrifugal and gravity settling basin, comprising a basin having a suitable bottom and a vertical, circular bounding wall of height considerably less than the basin diameter, said wall having an overflow notch on its upper edge and a cleaning opening at its bottom, an outlet pipe leading downwardly through the center of the basin bottom, the upper open end of the outlet pipe being above the bottom, a circular overflow wall concentrically surrounding the outlet pipe, said overflow wall being of height less than that of the overflow of the bounding wall, and liquid injecting tubes leading through the bounding wall somewhat above the basin bottom to inject liquid tangentially into the basin, said basin being unobstructed between said walls and bottom.

In witness that I claim the foregoing I have hereunto subscribed my name this 20th day of December 1912.

EDWARD S. COBB.

Witnesses:
ELWOOD H. BARKELEW,
JAMES F. BARKELEW.